United States Patent
Kallel et al.

[15] 3,690,244
[45] Sept. 12, 1972

[54] AIR VALVE WITH FAN ACTUATOR

[72] Inventors: Allen Kallel; Arthur F. Gowing, both of Santa Ana, Calif.

[73] Assignee: Wemac Company, Santa Ana, Calif.

[22] Filed: April 22, 1971

[21] Appl. No.: 136,319

[52] U.S. Cl. ............................. 98/40 A, 200/61.86
[51] Int. Cl. .................................................. F24f 13/06
[58] Field of Search ............... 200/61.86; 98/40 A, 43

[56] References Cited

UNITED STATES PATENTS

| | | | |
|---|---|---|---|
| 2,153,621 | 4/1939 | Howard | 200/61.86 X |
| 3,366,363 | 1/1968 | Hogan et al. | 98/40 A X |

*Primary Examiner*—William E. Wayner
*Attorney*—Smyth, Roston & Pavitt

[57] ABSTRACT

An air valve comprising a first valve member mounted for generally universal movement and having a passage therethrough, a second valve member having a passage therethrough and mounted in the passage of the first valve member for pivotal movement relative to the first valve member. Portions of the two valve members are spaced to define a substantially enclosed region within the air valve. An actuator is mounted on one of the valve members within the enclosed region and a switch is mounted on the other of the valve members within the enclosed region. Air is supplied to the passage of the second valve member by a fan which is driven by a motor. By turning of the second valve member, the switch can be opened and closed to thereby control the operation of the motor and of the fan. Air flow through the second valve member can be modulated by an appropriate valve element.

11 Claims, 7 Drawing Figures

PATENTED SEP 12 1972　　　　　　　　　　　　　3,690,244
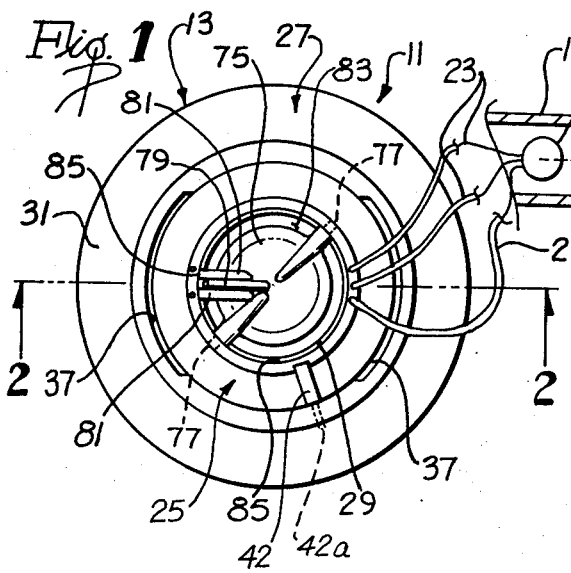
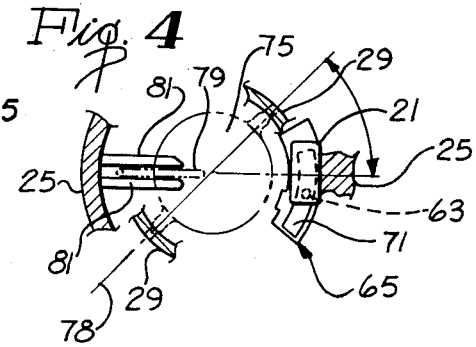
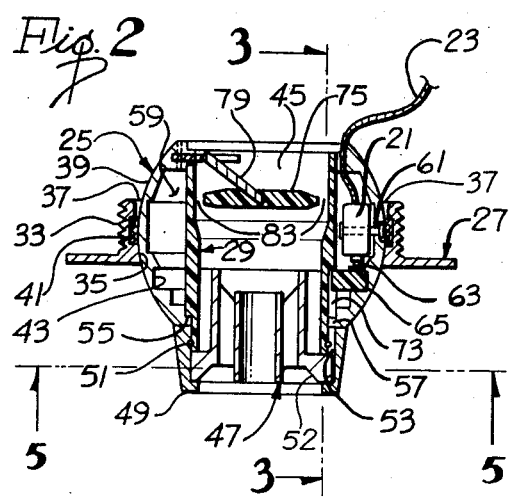
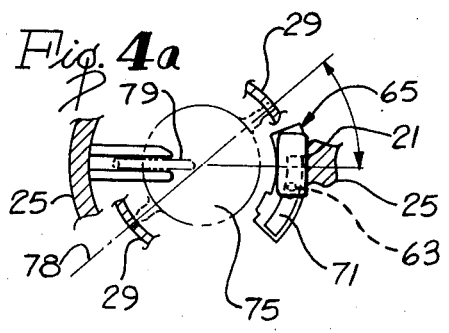
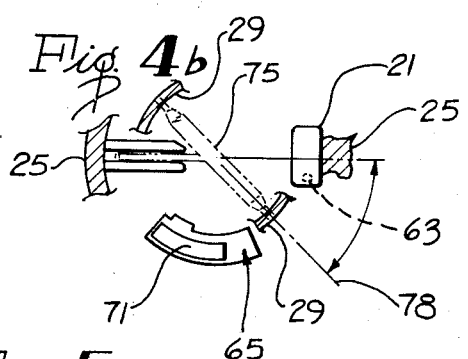
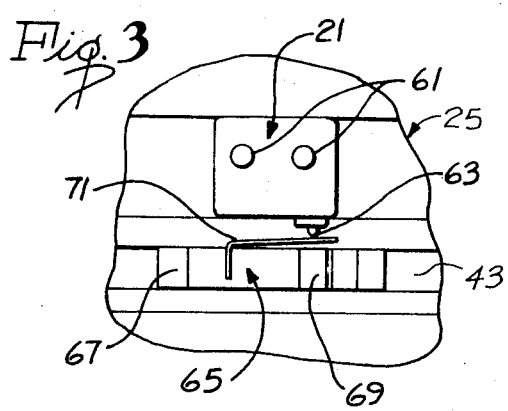
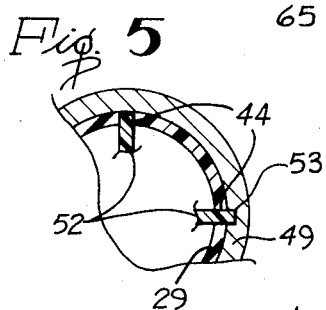
INVENTORS:
Allen Kallel
Arthur F. Gowing
By: Smyth, Roston & Pavitt
ATTORNEYS 3,690,244

AIR VALVE WITH FAN ACTUATOR

BACKGROUND OF THE INVENTION

A recently developed concept in air distribution systems for passenger aircraft calls for introduction of conditioned air at one or more locations within the cabin and recirculation of this air by individual distribution assemblies. Preferably each passenger has one of the distribution assemblies under his control.

Each of the distribution assemblies includes an air valve, a fan for forcing air through the valve, and a motor for driving the fan. A switch under the control of the passenger is provided for turning the motor on and off. When no air flow is desired, the passenger turns off the motor thereby reducing power consumption.

One proposal made heretofore is to position the passenger control switch on the air valve in the path of air flow from the fan. The problem with this arrangement is that continuous or frequent air flow over the switch tends to contaminate the contacts and otherwise hamper switch operation. The problem is accentuated in this kind of air distribution system because the air in the cabin is being continuously recirculated without necessarily having been refiltered. Accordingly, the air passing over the switch is contaminated with smoke and other gases which may leave a deposit on the switch. Another problem is the constant flexing and twisting of the switch leads when the switch is mounted externally on a rotatable member. This condition is totally unacceptable to aircraft standards. A further objection to the placement of the switch in the path of the air flow is that the turbulence and noise which it creates exceeds the accepted standards.

SUMMARY OF THE INVENTION

The present invention eliminates or substantially reduces deposits on the switch, turbulence and noise by enclosing the switch within the air valve. This construction maximizes compactness. A further advantage is that the air valve and the switch are a unitary, easily installed assembly.

The present invention combines all of these features with a valve element for modulating air flow through the air valve when the motor is driving the fan. With the present invention the fan is operated in an on or off mode, and when less than full air flow is desired, flow of air through the valve is mechanically modulated in accordance with the desires of the passenger controlling the same. When no air flow is desired, the switch is turned off to open the circuit to the motor thereby stopping the fan.

The air valve preferably includes a first valve member having an inner surface defining a passage therethrough, means cooperating with the first valve member for mounting the first valve member for generally universal movement, a second valve member having a passage therethrough and an outer surface, and means for mounting the second valve member in the passage of the first valve member for pivotal movement relative to the first valve member generally about the axis of the second valve member. Portions of the surfaces of the valve members are spaced to define a substantially enclosed region within the air diffuser. An actuator is mounted in the enclosed region and on one of the valve members. Circuit means which may be a switch is also mounted in the enclosed region on the other of the valve members. Accordingly, pivotal movement of the second valve member relative to the first valve member causes relative movement between the actuator and the switch to actuate the switch.

Ordinarily, in one relative angular position of the valve members, the switch opens the circuit to the motor and (FIG. in other relative angular positions of the diffuser members, the switch is closed to thereby close the circuit to the motor to cause fan operation. In this manner, the switch and its actuator are effectively sealed off from air flow through the air valve.

To provide for modulation of air flow through the passage of the second valve member, a valve element is provided in that passage. The position of the valve element in the passage controls the quantity of air flow through the air valve. The position of the valve element is controlled by the relative angular position of the two valve members. Specifically, when the fan is operating, the second valve member can be turned through a range of positions without turning the fan off and while so turning the second valve member, the valve element is moved to modulate air flow through the air valve.

The first diffuser member is preferably in the form of a shell and the second diffuser member is preferably in the form of a sleeve with the space between the shell and the sleeve forming the enclosed region. The switch is preferably mounted on the shell and the actuator can be advantageously carried by the sleeve and project radially outwardly therefrom. The shell has a circumferentially extending track in the form of a groove adapted to slidably receive at least a portion of the actuator. This construction assures reliability.

The invention can best be understood by reference to the following description taken in connection with the accompanying illustrative drawings.

BRIEF DESCRIPTION OF THE DRAWINGS

FIG. 1 is a top plan view of an air valve constructed in accordance with the teachings of this invention with the other components of the air distributor being shown schematically.

FIG. 2 is a sectional view taken generally along line 2—2 of FIG. 1.

FIG. 3 is an enlarged elevational view taken generally along line 3—3 of FIG. 2.

FIGS. 4—4b are diagrammatic top plan views showing the relationship between relative angular position of the air valve members, switch actuation, and valve element position.

FIG. 5 is a fragmentary sectional view taken generally along line 5—5 of FIG. 2.

DESCRIPTION OF THE PREFERRED EMBODIMENT

FIG. 1 shows an air distribution assembly 11. The distribution assembly 11 generally includes an air valve 13, a fan 15 for forcing air through the air valve, an electric motor 17 for driving the fan, a duct 19 for conducting air flow from an inlet not shown across the fan and into the air valve 13. Operation of the motor 17 is controlled by a switch 21 F(FIG. 2) which is coupled to the motor 17 by conductive leads 23.

The air valve 13 generally includes a valve member or ball member 25 (FIG. 2) mounted for universal movement in a socket 27 and another valve member or sleeve 29. The socket 27 has a circumferentially extending flange 31, external screw threads 33 and an inner spherical surface 35 which defines an axial passage through the socket. The threads 33 are adapted to attach the socket to external supporting structure (not shown). The inner surface 35 is cut away at diametrically opposed circumferentially extending regions to define loader slots 37 which permit the ball member 25 to be loaded into the socket 27.

The ball member 25 in the embodiment illustrated is in the form of a shell constructed of aluminum or other lightweight material. The ball member 25 has an outer spherical surface 39 adapted to slidably cooperate with the inner surface 35 of the socket 27 to thereby permit the socket to mount the ball member for universal movement relative thereto. A soft annular seal 41 carried by the socket provides a substantially air tight seal between the socket 27 and the ball member 25. The ball member 25 has a generally axially extending slot 42 (FIG. 1) formed on the outer surface thereof and a pin 42a fixed to the socket 27 is received within the slot to thereby prevent rotation of the ball member 25 relative to the socket 27 about a generally vertical axis as viewed in FIG. 2. This prevents twisting of the leads 23.

The ball member 25 has a track or guide which, in the embodiment illustrated, is in the form of an annular groove 43 on the interior surface of the ball member. The ball member 25 is hollow and has a passage extending axially therethrough with the opposite end portions of the ball member being flattened along substantially parallel planes.

The sleeve 29 is rotatably received within the ball member 25. The sleeve 29 is preferably constructed of a lightweight material such as a relatively hard plastic and the lower end thereof has a plurality of radial slots 44 (FIG. 5) therein. The sleeve 29 has a substantially cylindrical air passage 45 extending axially therethrough. An air directing vane assembly 47 is partially received in the lower end of the air passage 45 and is retained therein by a cap 49 which is mounted on the lower end of the sleeve by a split ring 51. The vane assembly 47 includes equally spaced radial vanes 52 which are received in the slots 44, respectively, to interlock the sleeve 29 and the vane assembly.

In the embodiment illustrated the key 53 is an integral extension of one of the radial vanes 52. To avoid interference between the key 53 and the split ring 51, the split ring is preferably located so that the key 53 is received in the circumferential separation in the split ring.

The sleeve 29 has an integral shoulder 55. The sleeve 29 is retained within the ball member 25 for rotation relative thereto about the axis of the sleeve by the shoulder 55 and the cap 49 which slidably receive an annular flange 57 of the socket 27.

Due to the generally concave nature of the interior surface of the ball member 25, the ball member and the sleeve 29 are spaced over portions of their lengths to define a substantially enclosed region 59. Although seals could be provided to sealingly enclose the region 59, the relatively close sliding fits between the shoulder 55 and the flange 57 and between the upper ends of the sleeve 29 and the ball member 25 are generally sufficient sealing for the region 59.

The switch 21 is rigidly mounted in any suitable manner such as by one or more rivets 61 to the ball member 25. As shown in FIG. 2, the switch 21 lies entirely within the enclosed region 59 and it is therefore protected and substantially isolated from the air flowing through the air passage 45. The leads 23 project upwardly as shown in FIG. 2 and out of the ball member 25 through appropriate apertures formed in the ball member for this purpose.

The switch 21 is a microswitch and has a downwardly projecting actuating button 63. The switch 21 is normally closed and is opened only when the button 63 is engaged to move it upwardly as viewed in FIGS. 2 and 3.

A switch actuator 65 (FIGS. 2 and 3) is mounted for rotational movement with the sleeve 29. The switch actuator 65 includes a body 67 which may be constructed of plastic material and which has a radially inwardly extending projection 69. The actuator 65 also includes a metallic leaf spring 71 mounted on the body and sloping upwardly therefrom. The leaf spring 71 is adapted to engage and resiliently urge the button 63 upwardly as viewed in FIG. 3 to thereby open the switch 21 in a first relative angular position of the sleeve 29 and the ball member 25.

The projection 69 is received in an axially extending slot 73 (FIG. 2) formed in the outer surface of the sleeve 29 and because of this structural relationship, the actuator 65 pivots with the sleeve 29 relative to the switch 21 and to the ball member 25.

The actuator 65 is retained within the slot 73 by the groove 43 formed in the inner surface of the ball member 25. As shown in FIG. 2, the actuator 65 is partially received within the groove 43 to thereby prevent the actuator from falling axially out of the slot 73. With this construction, the switch 21 is open and the fan 15 is shut down in the relative angular position of the sleeve 29 and the ball member 25 shown in FIGS. 1–4. In substantially all other relative angular positions of the sleeve and the ball member the leaf spring 71 does not contact the button 63, and accordingly, the switch 21 is closed so that the motor 17 operates the fan 15. Of course, these relationships of fan operation to angular position of the sleeve 29 can be varied.

A valve element 75 is mounted within the air passage 45 on the sleeve 29 by pins 77 for pivotal movement about a generally radial pivotal axis. Although the valve element may be of various shapes and materials, in the embodiment illustrated it is in the form of a circular disc of plastic material. The valve element 75 is coaxial with the sleeve 29.

An arm 79 is mounted on the valve element 75 at a central region of the valve element but radially spaced from the center of the valve element. The arm 79 projects axially upwardly and radially outwardly. As shown in FIG. 1, in the embodiment illustrated the arm 79 forms about a 45° angle in plan with the pivotal axis defined by the pins 77. The arm 79 is slidably received between the parallel legs 81 of a channel member which is rigidly affixed to the upper end of the ball member 25. The slot defined by the legs 81 projects radially of the passage 45 and it extends in the same radial direction as the arm 79. Thus, the portion of the arm 79 received between the legs 81 is held against circumferential movement while the sleeve 29 is rotated relative to the ball member 25. The portion of the arm 79 mounted on the valve element 75 rotates with the sleeve 29. Because the arm 79 is attached to the valve element 75 at a location spaced radially from the central axis of the sleeve 29, relative pivotal movement between the sleeve and the ball member causes the valve element to pivot between the closed position shown in FIG. 2 and a full open position in which the plane of the valve element is generally vertical. In the closed position, the periphery of the valve element 75 is preferably spaced from the interior surface of the sleeve 29 to define an annular clearance 83.

The mechanism for moving the valve element is of the type shown in U.S. Pat. No. 2,596,869. Other air throttling means responsive to the angular position of the sleeve 29 can also be used.

In the positions shown in FIGS. 1–4, the leaf spring 71 of the actuator 65 engages the button 63 of the microswitch 21 thereby opening the switch. Accordingly, the circuit to the motor 17 is open and the fan 15 is shut down. As the fan is not running, the valve element 75 is in the closed position in which it assumes a substantially horizontal position within the air passage 45. The purpose for the clearance 83 is that should the motor 17 and the fan 15, due to some malfunction, continue to run, the air passage 45 will not be completely blocked and the fan will not be subjected to excessive back pressure. Therefore, the closed position in the embodiment illustrated is not closed in the sense that air flow through the passage 45 is completely prevented.

When the passenger wishes to use the distribution assembly, he grasps the cap 49 (FIG. 2) and turns it clockwise as viewed in FIGS. 4, 4a and 4b. Because the cap 49 and the sleeve 29 are keyed together by the key 53, they rotate together about the axis of the sleeve 29 relative to the ball member 25, the latter being held against rotation by the pin 42 which is received in the slot 42a.

The relative rotation between the sleeve 29 and the ball member 25 has two effects. First, the actuator 65 rotates with the sleeve 29 relative to the button 63 of the switch 21. As the leaf spring 71 defines a resilient ramp, the force applied thereby against the button 63 progressively reduces. After turning through only a small number of degrees, the sleeve 29 reaches the position shown in FIG. 4a at which time the force applied by the leaf spring 71 to the button 63 is insufficient to retain the button in the upper or inner position. At this instant, a spring (not shown) within the switch 21 causes the button 63 to move downwardly to thereby close the switch and energize the motor 17. The fan then operates and conveys air through the duct 19 and the air passage 45. The air is diffused somewhat by the vane assembly 47, and the direction of air flow can be adjusted by the passenger by pivoting the sleeve 29 and the ball member 25 relative to the socket 27.

The second effect of turning of the sleeve 29 relative to the ball member 25 is on the position of the valve element 75. As the sleeve 29 is turned from the position shown in FIG. 4 to that shown in FIG. 4a, the relative movement between the sleeve and the ball member 25 acting through the arm 79 causes a slight pivotal movement of the valve element 75 about the axis 78 which is defined by the pins 77. This tilts the valve element out of the horizontal position shown in FIGS. 1, 2 and 4 to thereby partially open the passage 45. Accordingly, at the position of the sleeve 29 at which the fan 15 begins to run, the effective area of the opening through the passage 45 is enlarged somewhat, and maximum throttling of the air flow through the air passage 45 is obtained.

If the passenger desires greater air flow, he may continue movement of the sleeve 29 from the position shown in FIG. 4a toward that shown in FIG. 4b. As the sleeve 29 is rotated toward the position shown in FIG. 4b, the valve element 75 progressively opens and in the full open position shown in FIG. 4b, the valve element 75 is generally vertical and has achieved a maximum opening. As the leaf spring 71 is substantially out of contact with the button 63 between the positions shown in FIGS. 4a and 4b, the switch 21 remains closed and the fan 15 continues to operate. Thus, the motor 17 and fan 15 operate in either the on or off mode and modulation of air flow is achieved mechanically by variation in position of the valve element 75.

In the embodiment illustrated, the sleeve 29 can rotate relative to the ball member 25 through an angle of approximately 90° as illustrated in FIGS. 4–4b, although other lengths of arc of rotation could be utilized. Also, in the embodiment illustrated, the legs 81 cooperate with stops 85 in the form of end faces in an arcuate cut out in the upper end of the sleeve 29 to define the limits of relative movement of the sleeve (FIG. 1).

Although an exemplary embodiment of the invention has been shown and described, many changes, modifications, and substitutions may be made by one having ordinary skill in the art without necessarily departing from the spirit and scope of this invention.

We claim:

1. An air valve comprising:
    a first valve member having an inner surface defining a passage through said first valve member;
    means cooperating with said first valve member for mounting said first valve member for movement in a direction to change the orientation of the axis of said first valve member;
    a second valve member having a passage therethrough and an outer surface;
    means for mounting said second valve member in said passage of said first valve member for movement with said first valve member and for pivotal movement relative to the first valve member generally about the axis of said second valve member, said surfaces defining a substantially enclosed region within the air valve;
    an actuator;
    means for mounting said actuator in said region on one of said valve members whereby pivotal movement of said second valve member relative to said first diffuser member causes relative movement between said actuator and the other of said valve members;
    the surface of said other valve member defining a track in said region cooperating with said actuator during the relative pivotal movement of said valve members; and
    circuit means in said region on said other valve member and cooperable with said actuator to open a circuit in at least one relative angular position of said second valve member relative to said first valve member and to close said circuit in a second relative angular position of said second valve member relative to said first valve member.

2. An air valve as defined in claim 1 wherein said second relative angular position includes a range of relative angular positions said air valve including valve means for varying the quantity of air flow through said passage of said second valve member as said valve members are moved through said range of positions.

3. An air valve as defined in claim 1 wherein said circuit means includes a switch mounted on said first valve member and said actuator is carried by said second valve member, said actuator actuating said switch to open and close said circuit, respectively.

4. An air valve as defined in claim 1 wherein said first valve member includes a generally spherical shell, said second valve member includes a sleeve, said enclosed region being the space between said sleeve and said shell.

5. An air valve as defined in claim 1 wherein said means for mounting said actuator including interengaging means on said actuator and said second valve member and said track includes a circumferentially extending groove in said surface of said first valve member, said actuator being partially received in said groove for sliding movement therein during the relative pivotal movement of said second valve member relative to said first valve member.

6. An air valve as defined in claim 5 wherein said circuit means includes a microswitch rigidly mounted on said first valve member in said region, said microswitch being actuated by said actuator, said first valve member including a generally spherical shell and said second valve member including a sleeve, said region being the space between said sleeve and said shell, said second relative angular position includes a range of relative angular positions said air valve including valve means for varying the quantity of air flow through said passage of said second valve member as said valve members are moved through said range of positions.

7. An air valve comprising:
a ball member having a passage therethrough;
socket means for at least partially receiving said ball member and for mounting said ball member for generally universal movement relative to said socket means;
a sleeve having an air passage therethrough;
means for mounting said sleeve in said passage of said ball member for pivotal movement relative to said ball member generally about the axis of said sleeve;
said sleeve being spaced from said ball member over at least a portion of the length thereof to define a substantially enclosed region within said air valve;
a switch mounted on said ball member in said region; and
a switch actuator in said region pivotal with said sleeve and cooperable with said switch in a first relative angular position of said sleeve relative to said ball member to open the switch and operable through a range of relative angular positions of said sleeve relative to said ball member to close said switch.

8. An air valve as defined in claim 7 including valve means in said passage of said sleeve for varying the quantity of air flowing through the passage of said sleeve as said valve members are moved through said range of positions.

9. An air distribution assembly comprising:
a first valve member having a passage therethrough;
means for mounting said first valve member for movement;
a second valve member having a passage therethrough;
means for mounting said second valve member in said passage of said first valve member for movement with the first valve member and for pivotal movement relative to said first valve member generally about the axis of said second valve member;
portion of said first and second valve members being spaced to define a substantially enclosed region within the air valve;
an actuator;
means for mounting said actuator in said region on one of said valve members whereby pivotal movement of said second valve member relative to said first valve member causes relative movement between said actuator and the other of said valve members;
a fan for blowing air through said passage of said second valve member;
a motor for operating said fan;
circuit means in said region cooperable with said actuator to open the circuit to the fan in at least one relative angular position of said second valve member relative to said first valve member and to close the circuit to said motor in other positions of said second valve member relative to said first valve member; and
valve means for throttling the air flow through said passage of said second valve member when said valve members are in at least some of said other relative angular positions.

10. An air distribution assembly as defined in claim 9 wherein said circuit means includes a switch mounted on said first valve member and cooperable with said actuator to turn the motor off in said first relative angular position and to turn the motor on in any one of said other relative angular positions.

11. An air distribution assembly as defined in claim 10 wherein said first valve member has a circumferentially extending groove on the interior surface thereof for at least partially receiving said actuator to guide said actuator during the relative pivotal movement between said valve members.

* * * * *